US012643600B2

(12) United States Patent
Das et al.

(10) Patent No.: US 12,643,600 B2
(45) Date of Patent: Jun. 2, 2026

(54) METHODS AND APPARATUS TO CONTROL HAPTIC FEEDBACK SIGNALS IN A SELF-DRIVING VEHICLE

(71) Applicant: FORD GLOBAL TECHNOLOGIES, LLC, Dearborn, MI (US)

(72) Inventors: Ashrit Das, Canton, MI (US); Yijun Li, Dearborn, MI (US); Lodewijk Wijffels, Northville, MI (US); Tomas Mawyin, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/444,511

(22) Filed: Feb. 16, 2024

(65) Prior Publication Data

US 2025/0263119 A1     Aug. 21, 2025

(51) Int. Cl.
*B62D 6/00*        (2006.01)
*B62D 5/00*        (2006.01)

(52) U.S. Cl.
CPC ............. *B62D 6/008* (2013.01); *B62D 5/006* (2013.01)

(58) Field of Classification Search
CPC ............................... B62D 6/008; B62D 5/006
See application file for complete search history.

(56) References Cited

U.S. PATENT DOCUMENTS

| | | | |
|---|---|---|---|
| 6,282,472 B1 | 8/2001 | Jones et al. | |
| 7,530,422 B2 * | 5/2009 | Bolourchi | ............ B62D 5/0472 |
| | | | 180/444 |
| 7,676,310 B2 | 3/2010 | Klein et al. | |
| 8,714,047 B2 | 5/2014 | Yamamoto | |
| 9,616,928 B2 | 4/2017 | Lavoie et al. | |
| 10,077,056 B1 | 9/2018 | Fields et al. | |
| 10,106,190 B2 * | 10/2018 | Bremkens | ............ B62D 5/0481 |
| 10,139,824 B2 | 11/2018 | Sako et al. | |
| 10,703,407 B2 | 7/2020 | Maeda | |
| 11,572,096 B2 * | 2/2023 | Suzuki | ............... B62D 15/0265 |

(Continued)

FOREIGN PATENT DOCUMENTS

JP          5321906 B2     10/2013

OTHER PUBLICATIONS

Jha et al., "Sensors, Signals, Visualization, Imaging, Simulation and Materials," dated Nov. 2009, 22 pages.

(Continued)

*Primary Examiner* — Phutthiwat Wongwian
*Assistant Examiner* — Sherman D Manley
(74) *Attorney, Agent, or Firm* — Lorne Forsythe; Hanley, Flight and Zimmerman, LLC

(57)          ABSTRACT

Methods and apparatus to control haptic feedback signals in a self-driving vehicle are disclosed. An example apparatus comprises interface circuitry, machine-readable instructions, and at least one processor circuit to be programmed by the machine-readable instructions to detect a torque input to a steering wheel of a vehicle, the at least one processor circuit executing the machine-readable instructions to steer the vehicle along a path, determine a driver engagement metric based on the torque input, and based on a comparison of the driver engagement metric to a threshold, transmit a feedback signal to the steering wheel, the feedback signal indicative of an environment in which the vehicle is operating.

20 Claims, 7 Drawing Sheets

(56) References Cited

U.S. PATENT DOCUMENTS

| 11,919,580 B2 * | 3/2024 | Yang ..................... B62D 15/027 |
| 12,084,121 B2 * | 9/2024 | Albrecht ................ B62D 6/008 |
| 2005/0240328 A1 * | 10/2005 | Shirato .................. B62D 1/286 |
| | | 701/1 |
| 2006/0025911 A1 * | 2/2006 | Yao ........................ B62D 5/006 |
| | | 180/443 |
| 2011/0010054 A1 | 1/2011 | Wilson-Jones et al. |
| 2012/0046832 A1 * | 2/2012 | Kariatsumari ......... B62D 5/046 |
| | | 701/41 |
| 2016/0375923 A1 | 12/2016 | Schulz et al. |
| 2018/0237056 A1 * | 8/2018 | Bremkens ............. G01L 5/0042 |
| 2019/0031235 A1 * | 1/2019 | Lee ........................ B62D 5/006 |
| 2019/0286127 A1 * | 9/2019 | Watanabe ............ G05D 1/0061 |
| 2020/0031344 A1 * | 1/2020 | Okano .................... B62D 1/286 |
| 2020/0216115 A1 | 7/2020 | Jiang et al. |
| 2020/0317261 A1 | 10/2020 | Shoji et al. |
| 2020/0346686 A1 * | 11/2020 | Schäfer .................. B62D 6/008 |
| 2022/0055685 A1 | 2/2022 | Kim |
| 2022/0281473 A1 | 9/2022 | LaBarbera et al. |
| 2023/0014442 A1 * | 1/2023 | Bahena ................ B62D 5/0481 |
| 2024/0253694 A1 * | 8/2024 | Lee .................... B62D 15/0235 |
| 2024/0343302 A1 * | 10/2024 | Kunihiro ................ B62D 6/008 |
| 2025/0033695 A1 * | 1/2025 | Roeckner .............. B62D 5/006 |
| 2025/0128760 A1 | 4/2025 | Das et al. |

OTHER PUBLICATIONS

Warner et al., "Shared space: Motorists' perspective," Transportation Research, Part F: Traffic Psychology and Behavior, vol. 79, 2024, 12 pages.

Erdelyi et al., "Virtual prototyping of an automobile steering system using haptic feedback," dated Nov. 2009, 7 pages.

Altair HyperWorks, "Electric Power Assisted Steering System," dated May 18, 2023, 12 pages.

Dillmann et al., "Keeping the Driver in the Loop in Conditionally Automated Driving: A Perception-Action Theory Approach," Transportation Research, Part F: Traffic Psychology and Behavior, vol. 79, May 2021, 14 pages.

United States Patent and Trademark Office, "Non-Final Office Action," issued in connection with U.S. Appl. No. 18/491,557, dated Aug. 6, 2025, 31 pages.

United States Patent and Trademark Office, "Notice of Allowance and Fee(s) Due," issued in connection with U.S. Appl. No. 18/491,557, dated Jan. 9, 2026, 9 pages.

United States Patent and Trademark Office, "Non-Final Office Action," issued in connection with U.S. Appl. No. 18/980,934, dated Mar. 26, 2026, 16 pages.

* cited by examiner

100

METHODS AND APPARATUS TO CONTROL HAPTIC FEEDBACK SIGNALS IN A SELF-DRIVING VEHICLE

FIELD OF THE DISCLOSURE

This disclosure relates generally to vehicle control and, more particularly, to methods and apparatus to control haptic feedback signals in a self-driving vehicle.

BACKGROUND

In recent years, some vehicles have been outfitted with automated driving systems that can automatically drive or steer the vehicle in a self-driving mode. These systems include a path follower controller that analyzes the road ahead (e.g., using one or more cameras and/or map based systems) and determines how to steer the vehicle along a target path based on the analysis. The path follower controller determines an angle request to be applied by the steering system to steer the vehicle. In some instances, while in the self-driving mode, the driver may still need to manually steer the vehicle. Therefore, the driver may apply an input torque to the steering wheel. Typically, the driver may not have shared control of the vehicle. However, while in the self-driving mode, the steering driver interaction logic uses the angle from the path follower controller and the input torque from the driver to determine a final angle to be applied by the steering system to steer the vehicle. As such, the driver can still at least partially control the vehicle while in the self-driving mode.

Figure 1:
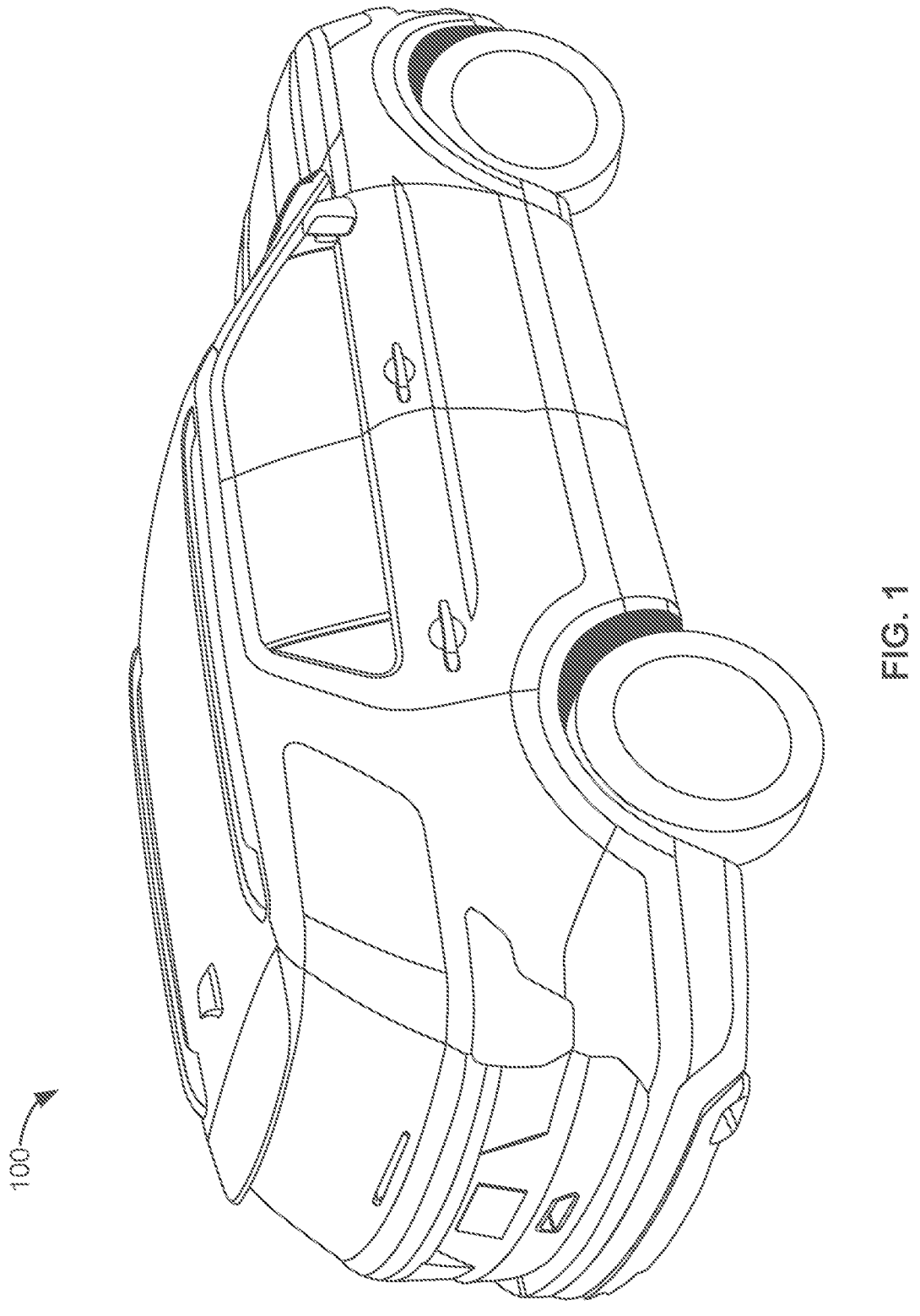
FIG. 1 illustrates an example vehicle in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

FIG. 1 illustrates an example vehicle 100 in which the examples disclosed herein can be implemented. The illustrated example of the vehicle 100 of FIG. 1 is merely an example of a sport utility vehicle (SUV) in which examples disclosed herein can be implemented. However, examples disclosed herein can also be implemented in connection with other types of vehicles (e.g., pickup trucks, sedans, semi-trucks, etc.). The example vehicle 100 includes an example steering controller that can operate to automatically steer and/or direct the vehicle along a target path. Such automated operation is referred to herein as a path follower (PF) or self-driving mode or operation. In some examples, the self-driving mode can be activated and deactivated by the driver by pressing a button and/or interacting with a display in the vehicle. During the self-driving mode, the steering controller of the vehicle 100 generates a PF angle request (e.g., independent of driver input) to direct the vehicle 100 along a target path.

Further, the example vehicle 100 includes an electronic control unit that utilizes a virtual boost curve (VBC) to determine an overlay angle to be added to the path follower angle request. This example overlay angle is primarily based on driver torque input to a steering wheel. Further, this overlay angle allows the driver to provide input and at least partially steer the vehicle while the vehicle is in the self-driving mode. The example steering controller determines a steering angle based on the driver torque input. In turn, an example angle controller can transmit the steering angle to a steering motor to steer the vehicle. As used herein, the steering angle based on the driver torque input may be referred to as a "VBC angle request." Additionally, the terms "steering angle" and "steering wheel angle" (SWA) are used interchangeably and refer to the angle to which the steering wheel has been rotated (e.g., by the driver, by the steering motor, etc.) relative to a neutral or center position. In some examples, the steering controller combines the VBC angle request with the PF angle request to generate a final angle request, and converts the final angle request to a torque request or output to be used to adjust the steering angle of the vehicle 100. Further description of the steering controller, the VBC angle request, the PF angle request, etc., can be found in U.S. patent application Ser. No. 18/491,557. U.S. patent application Ser. No. 18/491,557 is incorporated herein by reference in its entirety.

Typically, the steering controller can react to signal noise (e.g., noise, noisy signals, extraneous information, etc.) associated with the PF angle request. These feedback signals may indicate signal noise, extraneous information, etc., associated with self-driving commands. When the vehicle 100 is in a self-driving mode, in examples disclosed herein, the steering controller can filter the noisy data. In other words, instead of letting the noisy data affect the final angle request, which can cause customer dissatisfaction (e.g., via wheel movement and/or driver correction), the steering controller can limit and/or otherwise prevent the noisy data from being delivered to the steering wheel. In self-driving mode, the driver experience can be improved by filtering and/or otherwise controlling such feedback signals. For example, a driver may not want to feel and/or experience every small correction, sensing noise, etc., coming in through the path follower request to the final steering angle request when the vehicle 100 is in a self-driving mode. Examples disclosed herein enable a steering controller associated with a vehicle to filter path follower angle requests based on driver engagement levels and thereby adaptively filter the path follower noise to increase driver comfort.

Figure 2:
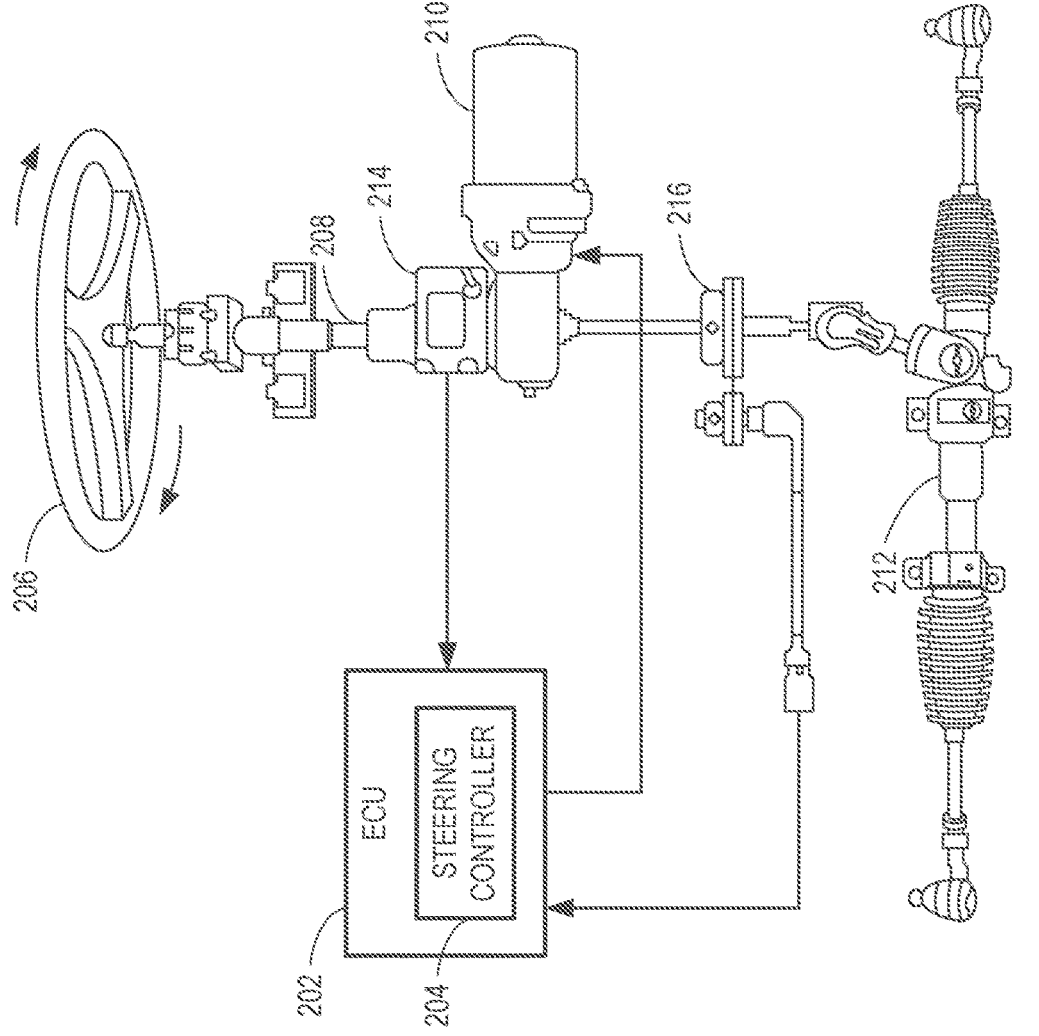
FIG. 2 is a schematic of an example steering system of the example vehicle of FIG. 1 including an example steering controller.

FIG. 2 is a schematic illustration of an example steering system 200 that can be implemented in the example vehicle 100 of FIG. 1. The example steering system 200 includes an electronic control unit (ECU) 202 including a steering controller 204, a steering wheel 206, a steering column 208, a steering motor 210, a steering rack 212, a torque sensor 214, and a pinion angle sensor 216. The example steering wheel 206 is mechanically connected to the steerable wheels of an example vehicle via the steering column 208, the steering rack 212, etc. As the driver of the vehicle 100 of FIG. 1 inputs torque to adjust the steering wheel angle of the steering wheel 206, the steering angle of the steerable wheels is correspondingly adjusted (e.g., turned left or right). In some examples, the steering column 208 is a single shaft extending between the steering wheel 206 and the steering rack 212. In other examples, the steering column 208 is a mechanical linkage including two or more interconnected shaft segments.

The example steering system 200 includes the motor 210. The motor 210 is operatively coupled to the steering wheel 206 and the steerable wheels of the vehicle 100. For example, the motor 210 is coupled to the steering rack 212. When activated, the motor 210 moves the steering rack 212, which thereby turns or angles the steering wheel 206 as well as the steerable wheels. Thus, the motor 210 operates to adjust the steering angle of the steering wheel 206 and, thus, also adjusts the angle of the steerable wheels with respect to the road. In some examples, the motor 210 can be used to provide power steering assistance. For example, in a traditional driving mode, based on torque input to the steering wheel 206, the electronic control unit 202 may activate the motor 210 to provide additional torque assistance for steering the vehicle 100. Additionally, the motor 210 can be activated to control the steering angle of the steering wheel 206 while the vehicle 100 is in a self-driving mode. The example steering controller 204 can operate in a self-driving mode to control the motor 210 and adjust the steering angle of the vehicle 100.

Figure 3:
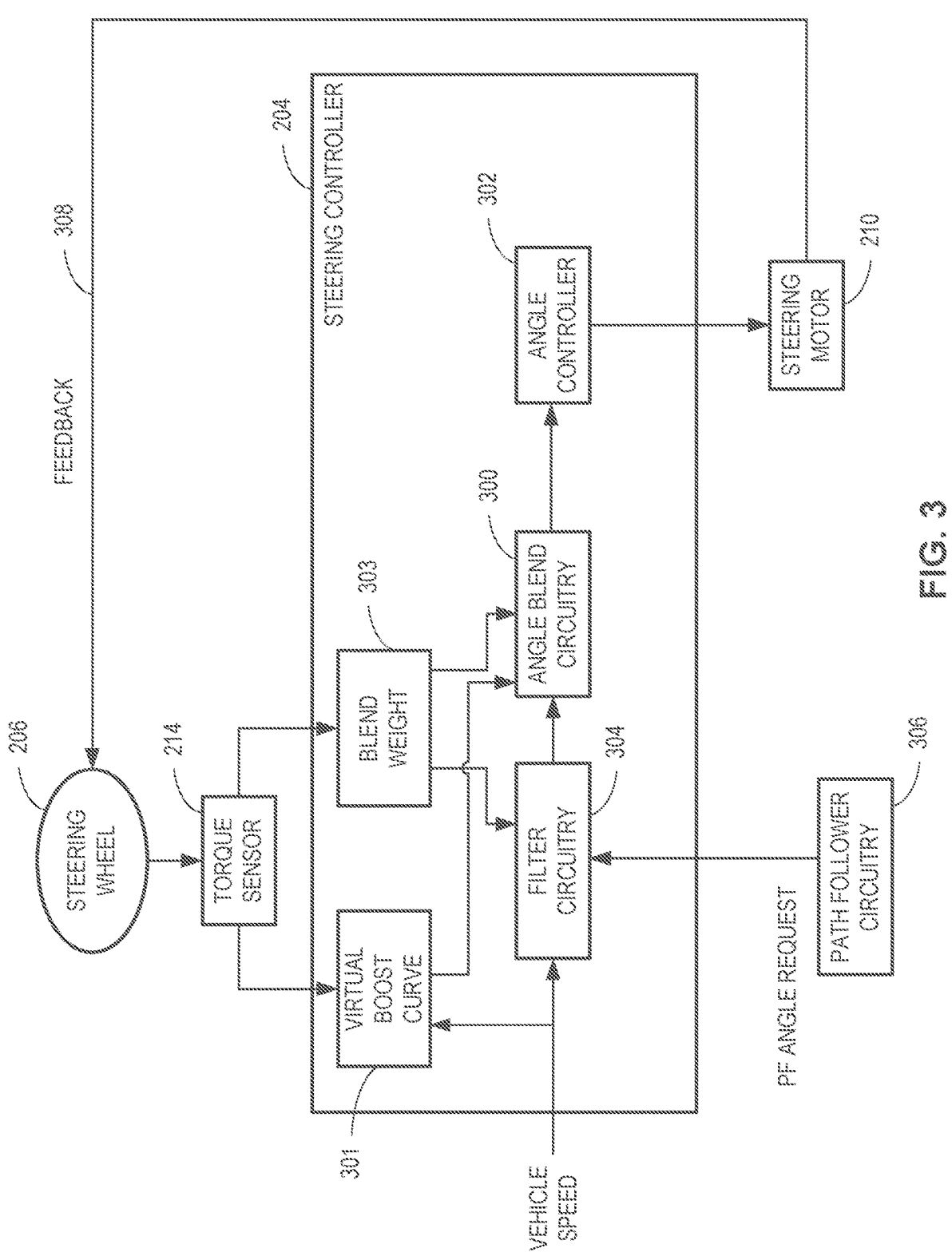
FIG. 3 is a block diagram of the example steering controller of FIG. 2.

FIG. 3 is a block diagram of the steering controller 204 of FIG. 2. When the vehicle 100 is in the self-driving mode, the steering controller 204 operates to control the motor 210 to adjust the steering of the vehicle 100 along a path (e.g., a target path). The steering controller 204 can also control the motor 210 based on driver torque input during the self-driving mode, such as when the driver attempts to manually turn the steering wheel 206. In some examples, the steering controller 204 is implemented in the electronic control unit 202 of FIG. 2. Additionally or alternatively, the steering controller 204 can be implemented in another control system, control unit, and/or computing system of the vehicle 100.

The example steering controller 204 includes example angle blend circuitry 300, an example VBC 301, an example angle controller 302, an example blend weight 303, and example filter circuitry 304. The example torque sensor 214 outputs sensor signals indicative of driver torque input applied to/with the steering wheel 206. The VBC 301 obtains the signals from the torque sensor 214 and, in turn, determines an input torque. Further, the VBC 301 determines a VBC angle request based on the input torque and the current steering wheel angle associated with the steering wheel 206. The example VBC angle request represents a desired driver steering angle, which is based on the current steering wheel angle and the driver input torque. In some examples, the VBC angle request is also based at least partially on vehicle speed.

Additionally, example path follower circuitry 306 determines and/or executes machine-readable instructions (e.g., a path follower angle request and/or any other self-driving command) to steer the vehicle 100 along a path. In FIG. 3, the path follower circuitry 306 is shown as separate from the steering controller 204. For example, the path follower circuitry 306 may be implemented by another controller of the electronic control unit 202. However, the path follower circuitry 306 may be part of the steering controller 204. When the driver of the vehicle 100 does not interact with the steering wheel 206 (e.g., applies zero input torque) during the self-driving mode, the path follower circuitry 306 controls the steering angle of the vehicle 100 (e.g., via a path follower angle request). In some examples, the path follower circuitry 306 determines the path follower angle request based on a target path of the vehicle 100, a velocity of the vehicle 100, a current steering angle of the steering wheel 206, and/or a projected path of the vehicle 100.

The example angle blend circuitry 300 adjusts and/or modifies the path follower angle request based on the VBC 301 (e.g., the VBC angle request), the path follower angle request, an angle blending weight, and/or the speed of the vehicle 100. In particular, the angle blend circuitry 300 determines a final angle request. In some examples, the blend weight (e.g., angle blending weight) 303 is an internal signal or data value that ranges in value from 0 to 1. An example blend weight of 0 corresponds to no driver input or interaction, and an blend weight of 1 corresponds to a fully engaged driver interaction. Therefore, when the driver is not interacting (e.g., angle blending weight equals 0), angle control of the vehicle 100 may be based solely on the path follower angle request. To generate the angle blending weight, the angle blend circuitry 300 can pass the driver torque input through a VBC lookup table, which provides a VBC weight (e.g., a preliminary weight). Further, the angle blend circuitry 300 can determine a velocity based weight based on the VBC weight and the speed of the vehicle 100. Thus, the angle blend circuitry 300 can modify the path follower angle request based on the velocity based weight, the VBC weight, the angle blending weight, etc. The example angle controller 302 converts the final steering angle request to a final torque request, which the motor 210 uses to adjust the steering angle of the steering wheel 206 to steer the vehicle 100 along the intended path.

Figure 4:
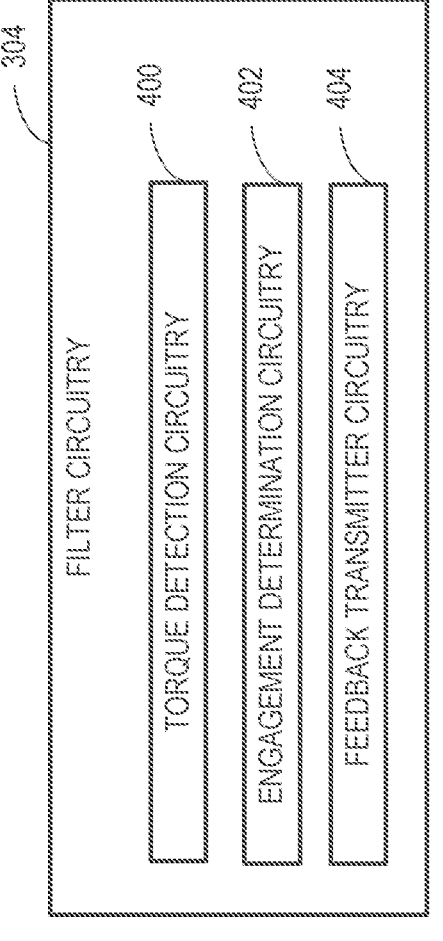
FIG. 4 is a block diagram of an example implementation of the filter circuitry of FIG. 3.

The example steering controller 204 includes the filter circuitry 304 to control haptic feedback (e.g., haptic feedback sent via signals) in a self-driving vehicle. As shown in FIG. 4, the example filter circuitry 304 includes example torque detection circuitry 400, example engagement determination circuitry 402, and example feedback transmitter circuitry 404. The example filter circuitry 304 of FIG. 4 may be instantiated (e.g., creating an instance of, bring into being for any length of time, materialize, implement, etc.) by programmable circuitry such as a Central Processor Unit (CPU) executing first instructions. Additionally or alternatively, the example filter circuitry 304 of FIG. 4 may be instantiated (e.g., creating an instance of, bring into being for any length of time, materialize, implement, etc.) by an Application Specific Integrated Circuit (ASIC) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

The example torque detection circuitry 400 detects a torque input (e.g., driver torque input) to the steering wheel 206 (FIG. 2) of the vehicle 100 (FIG. 1). In some examples, the torque detection circuitry 400 is coupled (e.g., via a network) to the torque sensor 214 to access the driver torque input. The example engagement determination circuitry 402 determines a driver engagement metric based on the torque input. For example, the engagement determination circuitry 402 access the blend weight 303 that indicates driver engagement. In some examples, the engagement determination circuitry 402 can transform the torque input into the driver engagement metric using any function (e.g., a linear function, a polynomial function, etc.). In other examples, the engagement determination circuitry 402 inputs the driver torque input into a lookup table to output the driver engagement metric.

The engagement determination circuitry 402 determines that the driver engagement metric (e.g., the angle blending weight) is 1 when the driver torque input is greater than zero. In other examples, the engagement determination circuitry 402 determines the driver engagement metric based on the driver torque input. For example, if the driver torque input is 1 Newton meter (Nm), then the engagement determination circuitry 402 can determine that the driver engagement metric is 0.1. If the driver torque input is 15 Nm, then the engagement determination circuitry 402 can determine that the driver engagement metric is 1. Alternatively, the engagement determination circuitry 402 determines that the driver engagement metric is 0 when the driver torque input is zero (e.g., 0 Nm). In some examples, the engagement determination circuitry 402 modifies (e.g., increases, decreases, etc.) the driver engagement metric based on a speed and/or velocity of the vehicle 100.

In some examples, the engagement determination circuitry 402 can compare the driver engagement metric to a threshold. In some examples, the threshold is 0.6 (e.g., 0.6/1). If the engagement determination circuitry 402 determines that the driver engagement metric is 0.2, then the engagement determination circuitry 402 determines that the driver engagement metric is less than (e.g., does not satisfy) the threshold (e.g., 0.2<0.6). Alternatively, if the engagement determination circuitry 402 determines that the driver engagement metric is 1, then the engagement determination circuitry 402 determines that the driver engagement metric is greater than (e.g., satisfies) the threshold (e.g., 1>0.6). In some examples, the engagement determination circuitry 402 monitors the driver engagement metric for updates, changes, increases, decreases, etc.

The example feedback transmitter circuitry 404 can determine whether to transmit a feedback signal (e.g., a haptic feedback signal) to the steering wheel 206 based on the comparison performed by the engagement determination circuitry 402. In some examples, the feedback transmitter circuitry 404 can parse and/or otherwise access an example feedback signal from the path follower angle request. For example, the path follower angle request can include information to steer the vehicle 100 along the path and feedback signals (e.g., noise, signal noise, haptic feedback, etc.). The example feedback signals can indicate an environment in which the vehicle is operating. For example, the environment may include an ambient condition (e.g., weather, wind, etc.) and/or a road condition (e.g., bumpy, slick, etc.). The example feedback transmitter circuitry 404 can parse the feedback signals from the path follower angle request. In turn, the feedback transmitter circuitry 404 can transmit at least one of the feedback signals to the steering wheel 206 and/or any other part of the vehicle (e.g., a display screen)

when the engagement determination circuitry 402 determines that the driver engagement metric is greater than the threshold. In the example of FIG. 3, the feedback signal is represented by line 308. The feedback transmitter circuitry 404 can provide the feedback signal to the steering wheel 206 via a mechanical vibration and/or rotation of the steering column 208, the steering rack 212, the motor 210 and/or any other mechanical linkage is coupled to the steering wheel 206. In some examples, the feedback signals include a movement (e.g., a vibration, a rotation, etc.) of the steering wheel 206 (e.g., felt/experienced by a driver of the vehicle 100). Alternatively, the feedback transmitter circuitry 404 can prevent the transmission of the at least one feedback signal when the engagement determination circuitry 402 determines that the driver engagement metric is less than the threshold.

Figure 6:
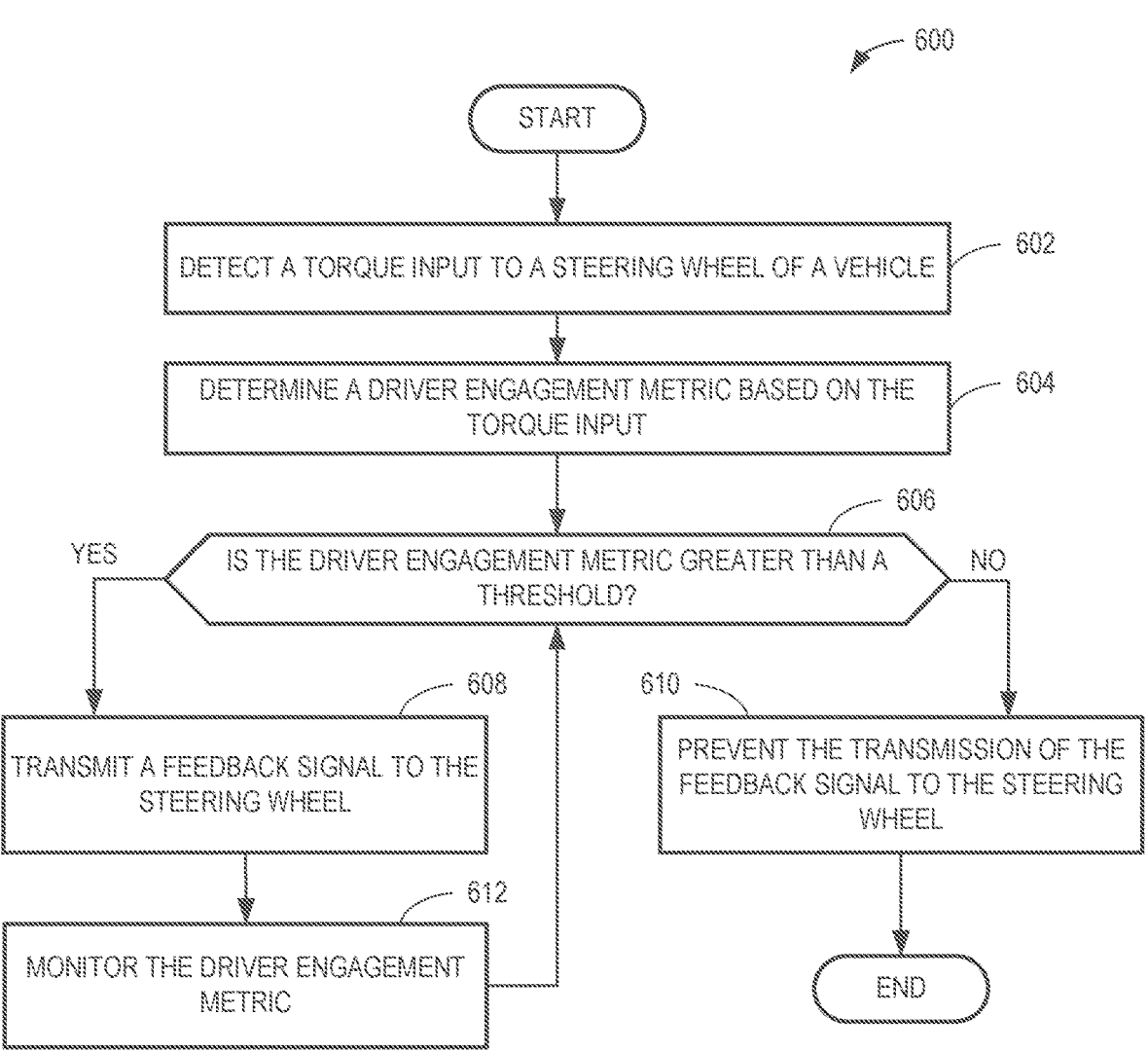
FIG. 6 is a flowchart representative of example machine readable instructions and/or example operations that may be executed, instantiated, and/or performed by example programmable circuitry to implement the example filter circuitry of FIG. 3.

In some examples, the torque detection circuitry 400 is instantiated by programmable circuitry executing detection instructions and/or configured to perform operations such as those represented by the flowchart of FIG. 6. In some examples, the example filter circuitry 304 includes means for detecting torque. For example, the means for detecting may be implemented by the torque detection circuitry 400. In some examples, the torque detection circuitry 400 may be instantiated by programmable circuitry such as the example programmable circuitry 712 of FIG. 7. For instance, the torque detection circuitry 400 may be instantiated by executing machine executable instructions such as those implemented by at least block 602 of FIG. 6. In some examples, the torque detection circuitry 400 may be instantiated by hardware logic circuitry, which may be implemented by an ASIC or XPU configured and/or structured to perform operations corresponding to the machine readable instructions. Additionally or alternatively, the torque detection circuitry 400 may be instantiated by any other combination of hardware, software, and/or firmware. For example, the torque detection circuitry 400 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the engagement determination circuitry 402 is instantiated by programmable circuitry executing engagement determination instructions and/or configured to perform operations such as those represented by the flowchart of FIG. 6. In some examples, the example filter circuitry 304 includes means for determining a driver engagement metric. For example, the means for determining may be implemented by the engagement determination circuitry 402. In some examples, the engagement determination circuitry 402 may be instantiated by programmable circuitry such as the example programmable circuitry 712 of FIG. 7. For instance, the engagement determination circuitry 402 may be instantiated by executing machine executable instructions such as those implemented by at least blocks 604, 606, 612 of FIG. 6. In some examples, the engagement determination circuitry 402 may be instantiated by hardware logic circuitry, which may be implemented by an ASIC or XPU configured and/or structured to perform operations corresponding to the machine readable instructions. Additionally or alternatively, the engagement determination circuitry 402 may be instantiated by any other combination of hardware, software, and/or firmware. For example, the engagement determination circuitry 402 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the feedback transmitter circuitry 404 is instantiated by programmable circuitry executing second transmission instructions and/or configured to perform operations such as those represented by the flowchart of FIG. 6. In some examples, the example filter circuitry 304 includes means for transmitting feedback. For example, the means for transmitting may be implemented by the feedback transmitter circuitry 404. In some examples, the feedback transmitter circuitry 404 may be instantiated by programmable circuitry such as the example programmable circuitry 712 of FIG. 7. For instance, the feedback transmitter circuitry 404 may be instantiated by executing machine executable instructions such as those implemented by at least blocks 608, 610 of FIG. 6. In some examples, the feedback transmitter circuitry 404 may be instantiated by hardware logic circuitry, which may be implemented by an ASIC or XPU configured and/or structured to perform operations corresponding to the machine readable instructions. Additionally or alternatively, the feedback transmitter circuitry 404 may be instantiated by any other combination of hardware, software, and/or firmware. For example, the feedback transmitter circuitry 404 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 5:
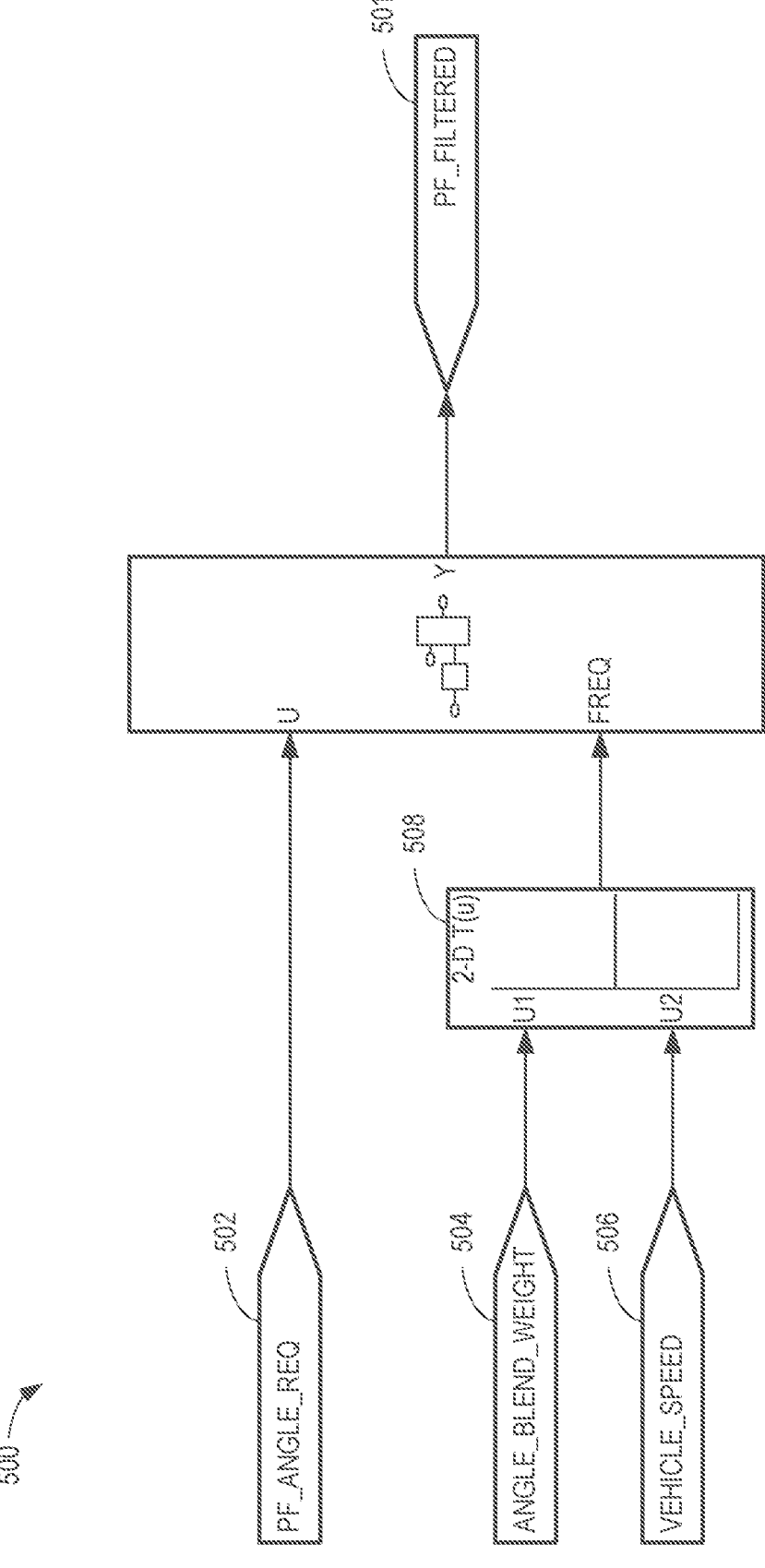
FIG. 5 illustrates an example operation for determining an example filtered path follower angle request.

FIG. 5 is an example operation 500 that the filter circuitry 304 performs to determine an example filtered path follower angle request 501. In some examples, the filtered path follower angle request 501 corresponds to a final angle request. In the example of FIG. 5, the filter circuitry 304 obtains the path follower angle request 502, the angle blend weight 504 (e.g., the blend weight 303), and the vehicle speed 506 from the angle blend circuitry 300. The example engagement determination circuitry 402 determines the driver engagement metric based on the angle blend weight 504 and the vehicle speed 506 via an example function 508 (e.g., a linear function, a polynomial function, a lookup table, etc.). For example, the engagement determination circuitry 402 increases the driver engagement metric when the angle blend weight 504 is relatively high (e.g., greater than 0.6) and/or when the vehicle speed 506 is relatively high (e.g., greater than 35 miles per hour (mph)). Alternatively, the engagement determination circuitry 402 decreases the driver engagement metric when the angle blend weight 504 is relatively low (e.g., less than 0.2) and/or when the vehicle speed 506 is relatively low (e.g., less than 15 mph). In some examples, the filtered path follower angle request 501 may include little to no haptic feedback signals. In other words, the filtered path follower angle request 501 causes a smoother driver experience compared to an unfiltered path follower angle request.

While an example manner of implementing the example filter circuitry 304 of FIG. 1 is illustrated in FIG. 4, one or more of the elements, processes, and/or devices illustrated in FIG. 4 may be combined, divided, re-arranged, omitted, eliminated, and/or implemented in any other way. Further, the example torque detection circuitry 400, the example engagement determination circuitry 402, the example feedback transmitter circuitry 404, and/or, more generally, the example filter circuitry 304 of FIG. 4, may be implemented by hardware alone or by hardware in combination with software and/or firmware. Thus, for example, any of the example torque detection circuitry 400, the example engagement determination circuitry 402, the example feedback transmitter circuitry 404, and/or, more generally, the example filter circuitry 304, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)). Further still, the example filter circuitry 304 of FIG. 4 may include one or more elements, processes, and/or devices in addition to, or instead of, those illustrated in FIG. 4, and/or may include more than one of any or all of the illustrated elements, processes and devices.

A flowchart representative of example machine readable instructions, which may be executed by programmable circuitry to implement and/or instantiate the example filter circuitry 304 of FIG. 4 and/or representative of example operations which may be performed by programmable circuitry to implement and/or instantiate the example filter circuitry 304 of FIG. 4, are shown in FIG. 6. The machine readable instructions may be one or more executable programs or portion(s) of one or more executable programs for execution by programmable circuitry such as the programmable circuitry 712 shown in the example programmable circuitry platform 700 discussed below in connection with FIG. 7 and/or may be one or more function(s) or portion(s) of functions to be performed by the example programmable circuitry. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIG. 6, many other methods of implementing the example filter circuitry 304 may alternatively be used. For example, the order of execution of the blocks of the flowcharts may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 6 is a flowchart representative of example machine readable instructions and/or example operations 600 that may be executed, instantiated, and/or performed by programmable circuitry to control haptic feedback signals. The example machine-readable instructions and/or the example operations 600 of FIG. 6 begin at block 602, at which the example torque detection circuitry 400 detects a torque input (e.g., driver torque input) to the steering wheel 206 of the vehicle 100. In some examples, the torque detection circuitry 400 is coupled to the torque sensor 214 to access the driver torque input.

At block 604, the example engagement determination circuitry 402 determines a driver engagement metric based on the torque input. For example, if the driver torque input is 1 Nm, then the engagement determination circuitry 402 can determine that the driver engagement metric is 0.1. If the driver torque input is 15 Nm, then the engagement determination circuitry 402 can determine that the driver engagement metric is 1. Alternatively, the engagement determination circuitry 402 determines that the driver engagement metric is 0 when the driver torque input is zero (e.g., 0 Nm).

At block 606, the example engagement determination circuitry 402 determines whether the driver engagement metric is greater than a threshold. If the example engagement determination circuitry 402 determines that the driver engagement metric is greater than a threshold, then control of the process proceeds to block 608. For example, if the threshold is 0.6 and the driver engagement metric is 1, then the engagement determination circuitry 402 determines that the driver engagement metric is greater than the threshold (e.g., 1>0.6). In such examples, control of the process proceeds to block 608. Alternatively, if the threshold is 0.6 and the driver engagement metric is 0.1, then the example engagement determination circuitry 402 determines that the driver engagement metric is less than the threshold (e.g., 0.1<0.6). In such examples, control of the process proceeds to block 610.

At block 608, the example feedback transmitter circuitry 404 transmits at least one haptic feedback signal to the steering wheel 206. In other words, the feedback transmitter circuitry 404 does not filter the path follower request. In other examples, the feedback transmitter circuitry 404 transmits the at least one haptic feedback signal via at least one mechanical linkage (e.g., the steering column 208, the steering rack 212, etc.) coupled to the steering wheel 206. The example feedback signals can indicate an environment in which the vehicle is operating. For example, the environment may include an ambient condition (e.g., weather, wind, etc.) and/or a road condition (e.g., bumpy, slick, etc.). In some examples, the feedback signals include a movement (e.g., a vibration, a rotation, etc.) of the steering wheel 206.

At block 612, the example engagement determination circuitry 402 monitors the driver engagement metric for updates, changes, increases, decreases, etc.

At block 610, the example feedback transmitter circuitry 404 prevents the transmission of the feedback signal to the steering wheel 206. For example, the feedback transmitter circuitry 404 can parse, separate, block, etc., the feedback signals from the path follower angle request. In other words, the feedback transmitter circuitry 404 filters the path follower angle request. Then, the process ends. In other examples, control of the process may proceed to block 606 as the engagement determination circuitry 402 compares (e.g., continuously compares and/or monitors) the driver engagement metric to the threshold.

Figure 7:
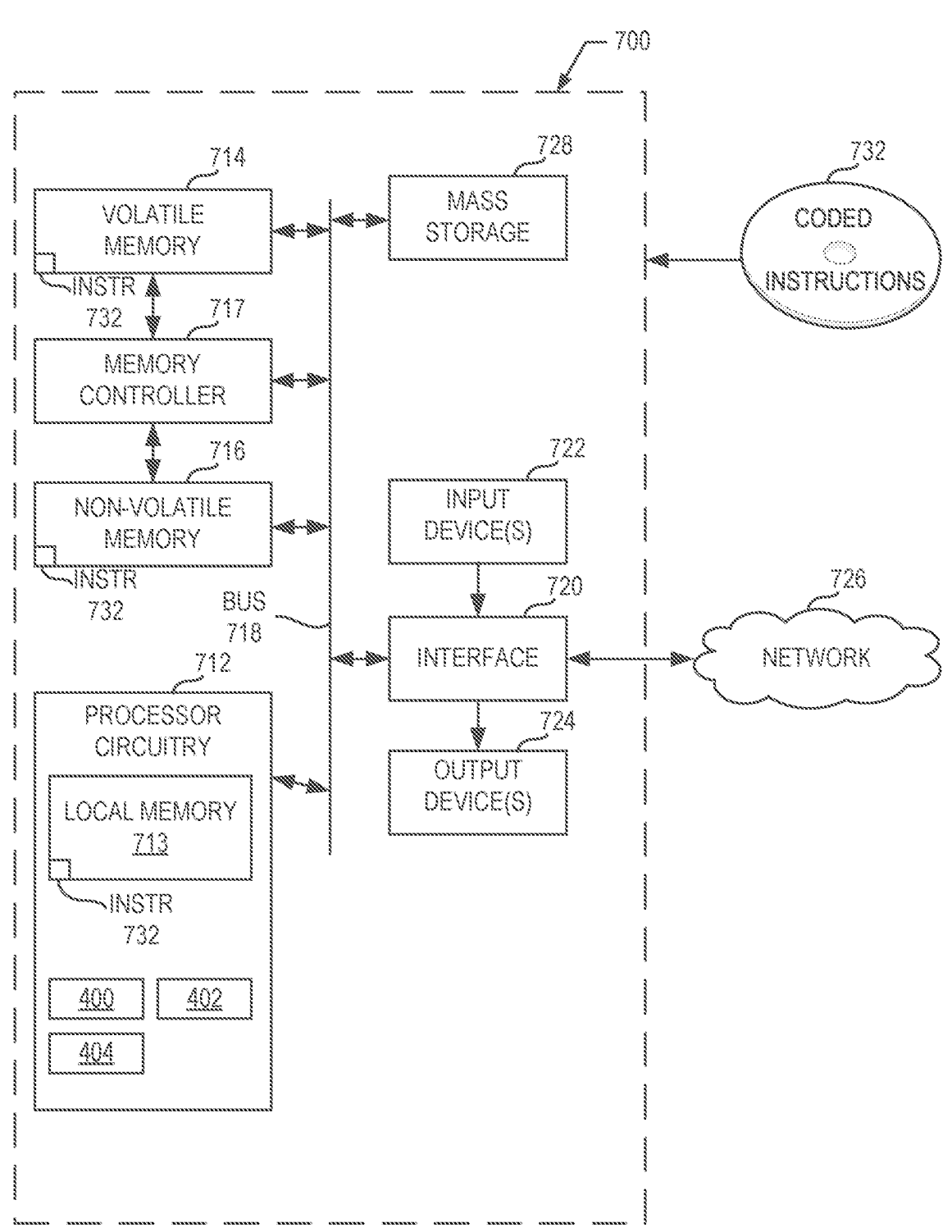
FIG. 7 is a block diagram of an example processing platform including programmable circuitry structured to execute, instantiate, and/or perform the example machine readable instructions and/or perform the example operations of FIG. 6 to implement the example filter circuitry 304 of FIG. 3.

FIG. 7 is a block diagram of an example programmable circuitry platform 700 structured to execute and/or instantiate the example machine-readable instructions and/or the example operations of FIG. 6 to implement the example filter circuitry 304 of FIG. 4. The programmable circuitry platform 700 can be, for example, a server, a personal computer, a workstation, a self-learning machine (e.g., a neural network), a mobile device (e.g., a cell phone, a smart phone, a tablet such as an iPad™), a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the example torque detection circuitry 400, the example engagement determination circuitry 402, and the example feedback transmitter circuitry 404.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIG. 6, may be stored in the mass storage device 728, in the volatile memory 714, in the non-volatile memory 716, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable a steering controller associated with a vehicle to control haptic feedback signals based on a driver engagement metric. As such, disclosed example adaptively filter the path follower noise for driver comfort. Disclosed systems, apparatus, articles of manufacture, and methods improve the efficiency of using a computing device by filtering haptic feedback from self-driving commands. Disclosed systems, apparatus, articles of manufacture, and methods are accordingly directed to one or more improvement(s) in the operation of a machine such as a computer or other electronic and/or mechanical device.

Example 1 includes an apparatus comprising interface circuitry, machine-readable instructions, and at least one processor circuit to be programmed by the machine-readable instructions to detect a torque input to a steering wheel of a vehicle, the at least one processor circuit executing the machine-readable instructions to steer the vehicle along a path, determine a driver engagement metric based on the torque input, and based on a comparison of the driver engagement metric to a threshold, transmit a feedback signal to the steering wheel, the feedback signal indicative of an environment in which the vehicle is operating.

Example 2 includes the apparatus of example 1, wherein one or more of the at least one processor circuit is to prevent the transmission of the feedback signal to the steering wheel when the driver engagement metric is less than the threshold.

Example 3 includes the apparatus of example 1, wherein the environment includes at least one of an ambient condition, or a road condition.

Example 4 includes the apparatus of example 1, wherein the at least one processor circuit is to transmit the torque input to a motor associated with the vehicle, the torque input to steer the vehicle.

Example 5 includes the apparatus of example 1, wherein the at least one processor circuit is to determine the driver engagement metric based on the torque input and a speed of the vehicle.

Example 6 includes the apparatus of example 1, wherein the feedback signal includes a movement of the steering wheel.

Example 7 includes the apparatus of example 6, wherein the movement of the steering wheel includes at least one of a vibration or a rotation.

Example 8 includes At least one non-transitory machine-readable medium comprising machine-readable instructions to cause at least one processor circuit to at least detect a torque input to a steering wheel of a vehicle, the at least one processor circuit executing the machine-readable instructions to steer the vehicle along a path, determine a driver engagement metric based on the torque input, and based on a comparison of the driver engagement metric to a threshold, transmit a feedback signal to the steering wheel, the feedback signal indicative of an environment in which the vehicle is operating.

Example 9 includes the at least one non-transitory machine-readable medium of example 8, wherein the machine-readable instructions are to cause one or more of the at least one processor circuit to prevent the transmission of the feedback signal to the steering wheel when the driver engagement metric is less than the threshold.

Example 10 includes the at least one non-transitory machine-readable medium of example 8, wherein the environment includes at least one of an ambient condition, or a road condition.

Example 11 includes the at least one non-transitory machine-readable medium of example 8, wherein the machine-readable instructions are to cause one or more of the at least one processor circuit to transmit the torque input to a motor associated with the vehicle, the torque input to steer the vehicle.

Example 12 includes the at least one non-transitory machine-readable medium of example 8, wherein the machine-readable instructions are to cause one or more of the at least one processor circuit to determine the driver engagement metric based on the torque input and a speed of the vehicle.

Example 13 includes the at least one non-transitory machine-readable medium of example 8, wherein the feedback signal includes a movement of the steering wheel.

Example 14 includes the at least one non-transitory machine-readable medium of example 13, wherein the movement of the steering wheel includes at least one of a vibration or a rotation.

Example 15 includes a method comprising detecting, by at least one processor circuit programmed by at least one instruction, a torque input to a steering wheel of a vehicle, the at least one processor circuit executing machine-readable instructions to steer the vehicle along a path, determining, by one or more of the at least one processor circuit, a driver engagement metric based on the torque input, and based on a comparison of the driver engagement metric to a threshold, transmitting, by one or more of the at least one processor circuit, a feedback signal to the steering wheel, the feedback signal indicative of an environment in which the vehicle is operating.

Example 16 includes the method of example 15, further including preventing the transmission of the feedback signal to the steering wheel when the driver engagement metric is less than the threshold.

Example 17 includes the method of example 15, wherein the environment includes at least one of an ambient condition, or a road condition.

Example 18 includes the method of example 15, further including transmitting the torque input to a motor associated with the vehicle, the torque input to steer the vehicle.

Example 19 includes the method of example 15, further including determining the driver engagement metric based on the torque input and a speed of the vehicle.

Example 20 includes the method of example 15, wherein the feedback signal includes a movement of the steering wheel.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
interface circuitry;
machine-readable instructions; and
at least one processor circuit to be programmed by the machine-readable instructions to:
  detect a torque input to a steering wheel of a vehicle, the at least one processor circuit executing the machine-readable instructions to steer the vehicle along a path;
  determine a driver engagement metric based on the torque input; and
  based on a comparison of the driver engagement metric to a threshold, transmit a feedback signal to the steering wheel, the feedback signal indicative of an environment in which the vehicle is operating.

2. The apparatus of claim 1, wherein one or more of the at least one processor circuit is to prevent the transmission of the feedback signal to the steering wheel when the driver engagement metric is less than the threshold.

3. The apparatus of claim 1, wherein the environment includes at least one of an ambient condition, or a road condition.

4. The apparatus of claim 1, wherein the at least one processor circuit is to transmit the torque input to a motor associated with the vehicle, the torque input to steer the vehicle.

5. The apparatus of claim 1, wherein the at least one processor circuit is to determine the driver engagement metric based on the torque input and a speed of the vehicle.

6. The apparatus of claim 1, wherein the feedback signal includes a movement of the steering wheel.

7. The apparatus of claim 6, wherein the movement of the steering wheel includes at least one of a vibration or a rotation.

8. At least one non-transitory machine-readable medium comprising machine-readable instructions to cause at least one processor circuit to at least:
  detect a torque input to a steering wheel of a vehicle, the at least one processor circuit executing the machine-readable instructions to steer the vehicle along a path;

determine a driver engagement metric based on the torque input; and
  based on a comparison of the driver engagement metric to a threshold, transmit a feedback signal to the steering wheel, the feedback signal indicative of an environment in which the vehicle is operating.

9. The at least one non-transitory machine-readable medium of claim 8, wherein the machine-readable instructions are to cause one or more of the at least one processor circuit to prevent the transmission of the feedback signal to the steering wheel when the driver engagement metric is less than the threshold.

10. The at least one non-transitory machine-readable medium of claim 8, wherein the environment includes at least one of an ambient condition, or a road condition.

11. The at least one non-transitory machine-readable medium of claim 8, wherein the machine-readable instructions are to cause one or more of the at least one processor circuit to transmit the torque input to a motor associated with the vehicle, the torque input to steer the vehicle.

12. The at least one non-transitory machine-readable medium of claim 8, wherein the machine-readable instructions are to cause one or more of the at least one processor circuit to determine the driver engagement metric based on the torque input and a speed of the vehicle.

13. The at least one non-transitory machine-readable medium of claim 8, wherein the feedback signal includes a movement of the steering wheel.

14. The at least one non-transitory machine-readable medium of claim 13, wherein the movement of the steering wheel includes at least one of a vibration or a rotation.

15. A method comprising:
  detecting, by at least one processor circuit programmed by at least one instruction, a torque input to a steering wheel of a vehicle, the at least one processor circuit executing machine-readable instructions to steer the vehicle along a path;
  determining, by one or more of the at least one processor circuit, a driver engagement metric based on the torque input; and
  based on a comparison of the driver engagement metric to a threshold, transmitting, by one or more of the at least one processor circuit, a feedback signal to the steering wheel, the feedback signal indicative of an environment in which the vehicle is operating.

16. The method of claim 15, further including preventing the transmission of the feedback signal to the steering wheel when the driver engagement metric is less than the threshold.

17. The method of claim 15, wherein the environment includes at least one of an ambient condition, or a road condition.

18. The method of claim 15, further including transmitting the torque input to a motor associated with the vehicle, the torque input to steer the vehicle.

19. The method of claim 15, further including determining the driver engagement metric based on the torque input and a speed of the vehicle.

20. The method of claim 15, wherein the feedback signal includes a movement of the steering wheel.

* * * * *